Jan. 4, 1966  F. A. STANIER  3,227,425
KETTLE OUTLET AND VALVE ASSEMBLY
Filed May 27, 1963
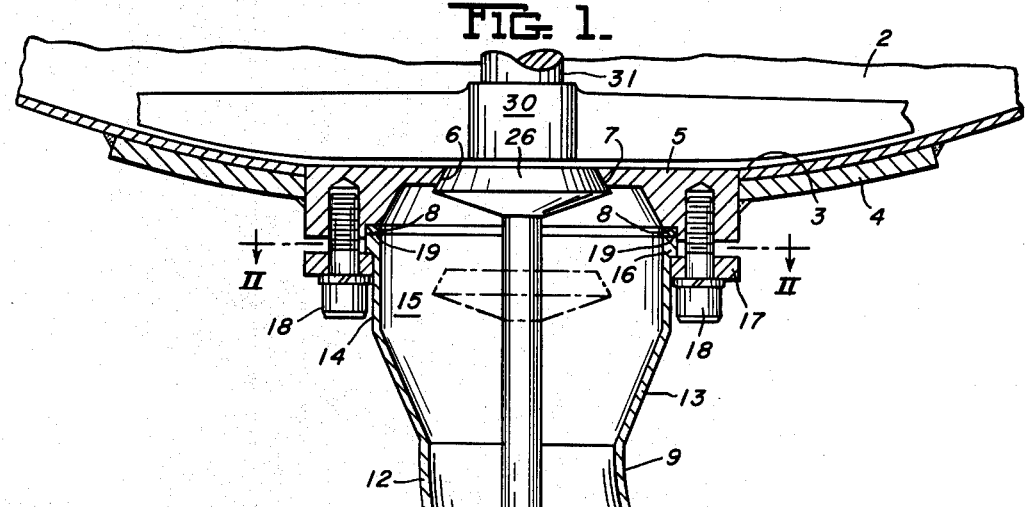
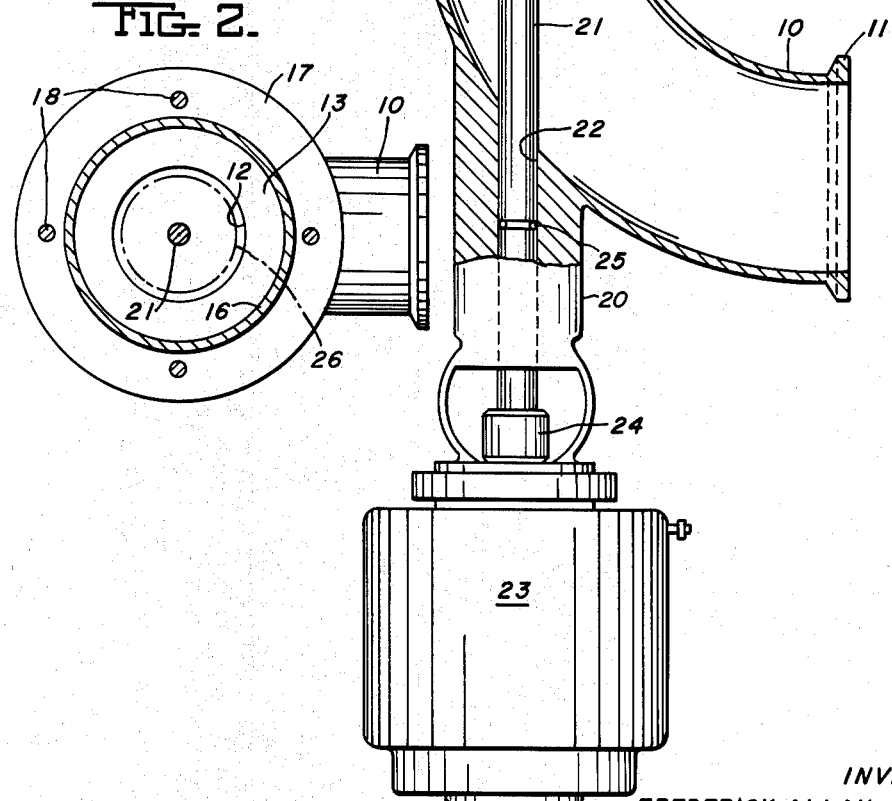
INVENTOR.
FREDERICK ALLAN STANIER
By Christy, Parmelee, & Strickland
Attorneys

United States Patent Office 3,227,425
Patented Jan. 4, 1966

3,227,425
KETTLE OUTLET AND VALVE ASSEMBLY
Frederick Allan Stanier, Pittsburgh, Pa., assignor to H. J. Heinz Company, Pittsburgh, Pa., a corporation of Pennsylvania
Filed May 27, 1963, Ser. No. 283,354
1 Claim. (Cl. 259—43)

This invention relates to kettles and similar vessels having a quick opening discharge valve at the bottom thereof, and pertains especially to an improved valve construction for such vessels.

Cooking vessels used in the commercial preparation of foods commonly have a rounded or somewhat hemispherical bottom with an outlet valve positioned in the lowest point for the drainage of contents therefrom. Customarily, the valve comprises a relatively long curved elbow with a vertical leg that is attached to the bottom of the kettle and which has a horizontal leg that may be connected to a pipe through which the kettle contents are carried to a receiving station. There is a concentric valve stem in the vertical leg that extends through a tangentially projecting guide on the exterior of the elbow that also functions as the gland for the valve stem. A valve actuator, such as fluid pressure operated piston type servo-motor is suspended from the elbow and attached to the valve stem for raising and lowering the valve stem. At the upper end of the stem, within the vessel, is a valve element that is raised above the kettle bottom by upward movement of the stem to open the valve and is lowered against a seat in the kettle bottom to close it.

Equipment used in food processing must be kept clean and sterile and free of food deposits when not in use, so that such a kettle and also its valve must be kept clean. The arrangement above-described does not permit fast or easy removal of the valve, and it is difficult where such valves are used to clean the area around the valve seat. Moreover, the valve stem passing through the valve seat into the kettle may obstruct the outflow of material, especially solid pieces of food, when the valve is open. Additionally, where the kettle is used with an agitation or mixing device, such an upwardly opening valve interferes with the agitation or mixing device working close to the bottom of the vessel.

The present invention has for its principal object to provide a kettle and valve construction which will obviate the drawbacks of the present valves and provide a valve arrangement that may be easily removed and replaced.

According to the present invention, the valve body comprises an elbow as with presently used valves with the valve stem similarly arranged, but the valve element on the stem moves upwardly into the outlet port in the kettle bottom against a reversely tapered valve seat that surrounds the port to close the valve and moves downwardly away from the seat to open the valve. Instead, however, of the elbow being of uniform diameter as is usual, the upper end portion of the elbow is flared upwardly and outwardly into a vertical, preferably cylindrical, valve chamber, the length of which is substantially greater than the maximum length of travel of the valve element, and the diameter of which is larger than the valve element and the port in the bottom of the kettle so that when the valve is open the kettle contents may flow through the port, through the clearance between the valve element and the surrounding wall of the cylinder freely and easily and through the funnel-like flared wall of the tube below the cylindrical chamber into the curve of the elbow.

The invention and its objects and advantages will be more fully apparent from the following detailed description in conjunction with the accompanying drawings, in which:

FIG. 1 is a vertical section of a small portion of the kettle bottom and the valve assembled thereon; and FIG. 2 is a horizontal section in the plane of line II—II of FIG. 1, this view being on a slightly smaller scale than FIG. 1.

Referring to the drawing, 2 designates generally the kettle, only a fragment of which is shown, and which customarily has a rounded or somewhat hemispherical bottom, the lowermost portion of which is designated 3. The kettle has a central opening which is the lowest point in the interior of the kettle and there is a reinforcing plate 4 welded to the outside of the kettle bottom in which there is a similar opening. A seating ring 5 formed as a separate member is set in this opening flush with the interior of the kettle bottom and it may be secured permanently in place by welding. It has a central port 6 therethrough of downwardly increasing diameter, the surrounding metal being reversely tapered to form a valve seat 7. Below the valve seat 7, the seating ring is counterbored to provide a shoulder 8.

The valve body designated generally as 9 is in the form of a tube or pipe curved about a relatively large radius so as to provide a uniformly curving passage in which material or sediment may not accumulate. It forms an elbow which has a horizontal leg 10 which may have a flange 11 at its end for coupling it to a pipe into which material is to be discharged.

The vertical leg 12 of the body has an upwardly and outwardly sloping flared wall portion 13 above which is a preferably cylindrical section 14 providing a vertically elongated valve chamber 15 in the upper end of the body, the diameter of which is greater than the diameter of the port 6 in the valve seat and larger than the diameter of the body in the curved valve body below the flared portion 13.

The top of the chamber 15 has a thickened flange portion 16 therearound which is of the same diameter as the shoulder 8 on the seat ring 5 and with which it is in confronting relation.

Around the upper end of the valve body, fitted under the flanged end 16, there is a loose clamping ring 17 that is bolted to the underside of the seat ring by several bolts or cap screws 18 passing through ring 17 and screwed into the seating ring. There is a gasket 19 interposed between the shoulder 8 and the flange 16 and this gasket will be tightly clamped between these surfaces when the bolts or cap screws 18 are tightened to hold the top edge of the valve body tight against the seating ring.

There is a tangentially extending integral boss or projection 20 on the exterior of the elbow, centered below the chamber 15 and the valve port 6. There is a valve stem 21 in the vertical leg of the elbow extending axially up into the chamber 15 and which extends down through a bore 22 in the boss 20 to the exterior of the valve body. A valve actuator 23 is carried on the valve body with a movable part 24 connected with the lower end of the valve stem. This is here illustrated as a fluid pressure operated piston type actuator for raising and lowering the valve stem through a limited range and is similar to those now used in valves for this purpose.

The boss 20, in which the valve stem has a close sliding fit and which forms a guide for the stem and takes the place of a gland, is spaced well below the flared portion 13 of the valve body so that there is a considerable length of the valve stem in the vertical leg above the point where the stem passes down through the boss. An O- ring 25 on the valve stem provides a simple fluid-tight seal between the valve stem and its guide.

The valve stem 21 has a valve element 26 fixed to the upper end thereof, the valve element being generally in the form of a disk having a beveled periphery, the bevel of which matches the reverse bevel or taper on the valve seat 7 and the diameter of the valve element is such that when it is seated its top surface is flush with the bottom of the kettle, as shown in FIG. 1. When it is moved downwardly to open the valve, that is, to its lowermost limit of travel, as indicated in dotted lines in FIG. 1, it is in the chamber 15 at a level intermediate the underside of the seat and the top of the flared or tapered portion 13. Also, the distance from its periphery to the inside cylindrical wall of the chamber when the valve is fully open provides a clear passage around the periphery of the valve which is as great or greater than the minimum area of the port 6 through the seating ring.

By reason of the enlarged cylindrical valve chamber in the upper end of the elbow with the flared portion 13 below it for funneling the flow of liquid into the remaining length of the elbow, and because the valve element never retracts to a level where it is in this flared funnel or throat when the valve is open, material may flow freely out the bottom of the vessel, be deflected radially in a streamline flow around the valve element and flow axially down into the tapered throat with little impedance to its flow. There are no corners or obstructions in the path of flow, other than the valve element itself, to produce eddying or on which sediment can collect. The port 6 in the bottom of the kettle is not partially obstructed by the valve stem, as with valves that open upwardly into the kettle, and solids, such as small chunks of meat, are less likely to become caught in the valve, especially if the valve is closed before the vessel is emptied. Cleaning and sterilizing of the valve and valve seat is easily accomplished and the entire valve body and valve element may be easily removed for sterilizing by removing the clamping bolts or cap screws 18, assuming, of course, that a usual sanitary coupling as commonly used in the food industry is employed on the outlet end of the elbow for enabling the discharge end of the valve body to be readily uncoupled from the pipe to which it is connected. The sealing gasket 19, it will be noted, is out of the direct line of flow of material through the seat ring into the valve chamber 15.

In the drawings I have indicated at 30 a form of stirring, agitating or scraping device on a shaft 31, and it will be seen that the valve in no way interferes with the device 30 which may be rotated even when the valve is open and operates against the bottom of the kettle. Even when a manually operated spatula or scraper is used for removing residue from the kettle it is much easier to use it where the valve is constructed as here shown.

While a preferred construction of the valve has been shown and specifically described, various changes and modifications may be made in the specific form and construction of the parts within the scope of the invention as defined by the following claim.

What is claimed is:

A kettle and kettle outlet valve assembly comprising a kettle having a bottom with an opening therethrough, a valve seating ring in said opening having a top surface flush with the kettle bottom and having a completely open discharge port therethrough with a valve seat around the port, a valve body comprising a curved elbow with an upwardly-extending leg secured to the seating ring in concentric relation to the port, the diameter of the upper end of the upwardly-extending leg being greater than the diameter of the port through the seating ring and providing a vertically-elongated valve chamber, a valve element movable within the valve chamber between a position against the valve seat for closing the port and a position intermediate the length of the chamber to open the valve, a stem connected to the valve element extending down through the vertical leg and passing tangentially through the curved elbow below the valve chamber, and means exteriorly of the valve body and the kettle for moving the stem and valve element to open and close the port, the port being of downwardly increasing diameter to limit the upward travel of the valve element, said kettle having a mechanically-operated stirrer therein positioned substantially against the bottom of the kettle and said seating ring.

References Cited by the Examiner

UNITED STATES PATENTS

| 363,763 | 5/1887 | Puffer | 251—144 X |
| 2,953,345 | 9/1960 | Slemmons | 251—144 |

FOREIGN PATENTS 48,583  6/1940  Netherlands.

WALTER A. SCHEEL, Primary Examiner.

GEORGE J. NORTH, CHARLES A. WILLMUTH, Examiners.